United States Patent
Cox et al.

(10) Patent No.: US 12,019,164 B1
(45) Date of Patent: Jun. 25, 2024

(54) UNINTENTIONAL RF RADIATORS FILTER PROTECTION FOR A COSPAS SARSAT EMERGENCY LOCATOR TRANSMITTER (ELT) GNSS RECEIVER

(71) Applicants: William Cox, Sunrise, FL (US); Irek Gora, Boca Raton, FL (US)

(72) Inventors: William Cox, Sunrise, FL (US); Irek Gora, Boca Raton, FL (US)

(73) Assignee: ACR ELECTRONICS, INC., Fort Lauderdale, FL (US)

( * ) Notice: Subject to any disclaimer, the term of this patent is extended or adjusted under 35 U.S.C. 154(b) by 359 days.

(21) Appl. No.: 17/475,275

(22) Filed: Sep. 14, 2021

(51) Int. Cl.
| | | |
|---|---|---|
| *G01S 19/17* | (2010.01) | |
| *G01S 19/07* | (2010.01) | |
| *G01S 19/11* | (2010.01) | |

(52) U.S. Cl.
CPC ............ *G01S 19/17* (2013.01); *G01S 19/071* (2019.08); *G01S 19/11* (2013.01)

(58) Field of Classification Search
CPC ......... G01S 19/071; G01S 19/11; G01S 19/17
USPC ................................................... 455/456.1
See application file for complete search history.

(56) References Cited

U.S. PATENT DOCUMENTS 7,586,463 B1 * 9/2009 Katz ............... H01Q 21/28
343/718

\* cited by examiner

*Primary Examiner* — Joel Ajayi
(74) *Attorney, Agent, or Firm* — Mark D. Bowen, Esq.; Malin Haley DiMaggio & Bowen, P.A.

(57) ABSTRACT

This invention relates to an emergency locator transmitter (ELT) that transmits an emergency signal to a global navigational satellite system (GNSS) indicating an aircraft crash location, or an aircraft distress tracker event signal that triggers the ELT to provide location of the aircraft, the ELT including a GNSS RF receiver. The invention ELT includes 406 MHz RF signal blanking switch, a GNSS high pass filter, RF radiator and EMI filter protection for the GNSS receiver to protect the GNSS receiver from 406 MHz emergency signals, unintentional RF radiators and electromagnetic interference (EMI) typically found in aircraft.

2 Claims, 1 Drawing Sheet

UNINTENTIONAL RF RADIATORS FILTER PROTECTION FOR A COSPAS SARSAT EMERGENCY LOCATOR TRANSMITTER (ELT) GNSS RECEIVER

BACKGROUND OF THE INVENTION

1. Field of the Invention

This invention relates generally to an emergency locator transmitter (ELT) that transmits an emergency signal to a satellite system indicating an aircraft crash location, or an aircraft distress tracker signal that triggers location of the aircraft, the ELT including a global navigation satellite system (GNSS) RF receiver, and specifically, the invention relates to an ELT that includes a 406 MHz blanking switch and RF radiator and electromagnetic interference (EMI) filter protection for the GNSS receiver to protect the GNSS receiver from 406 MHz RF and unintentional RF radiators and EMI found in typical aircraft.

2. Description of Related Art

The use of an ELT as an independent battery-powered transmitter in an aircraft, activated by excessive G forces experienced during a crash, for transmitting a digital signal to provide an emergency location is well known in the art. Recent aviation events have resulted in autonomous distress trackers circuitry, that has become incorporated into an ELT, that also includes a GNSS receiver to provide navigational location of the ELT during a distress tracker activation or crash.

An aircraft is well known for a variety of communication devices that include RF transmission and receiver signals, HF, UHF, VHF and Iridium RF signals, in addition to the possible ELT RF signal transmissions such as emergency frequencies 121.5 MHz, 243 MHz, and primarily 406 MHz RF.

Because of the variety of unintentional RF radiators provided on almost all aircraft, of several different communication devices, Applicant's invention provides RF filters that can protect the ELT with a GNSS receiver on board an aircraft, that could be damaged by unintentional RF radiator signals and EMI, and ELT emergency signal transmissions.

SUMMARY OF THE INVENTION

The invention comprises a RF radiator and electromagnetic interference filter protection in an ELT having a GNSS receiver, to protect the GNSS receiver from EMI in an aircraft.

An emergency locator transmitter (ELT), having a 406 MHz transmitter, for transmitting an emergency satellite signal, triggered by G forces during a crash of the aircraft or a distress tracker emergency event, for location of the aircraft. The ELT also includes a global navigation satellite system (GNSS) RF receiver to receive satellite navigation information that can be utilized in the ELT to determine the precise navigational location of the aircraft at the time of the emergency signal transmission.

The ELT, including the GNSS receiver, includes an ELT triplexer—EMI protection filter in the GNSS receiver circuitry, connected to the ELT antenna, that includes a 406 MHz blanking switch, a GNSS high-pass filter, and first and second SAW (surface acoustic wave) filters for GNSS L1 and E1 for protecting the GNSS receiver from RF damage.

The 406 MHz blanking switch protects the GNSS receiver from damage and receiver degradation during high power 406 MHz transmissions by the ELT by providing isolation between the transmitter of the ELT and the GNSS receiver.

A pair of different SAW filters, between the antenna and the GNSS filter provide filtering to prevent the ELT GNSS receiver sensitivity degradation from various unintentional RF frequencies such as high power Iridium transmitters, commonly found on aircraft, high-power KU and KA band transmitters, and different interfering EMI environments on different aircraft, to protect the GNSS sensitivity by using a common surface mount part footprint.

The GNSS high-pass filter and the No. 1 and No. 2 SAW filters also protect the GNSS receiver from high-power 121.5 MHz or 243 MHz transmitters or their harmonics from these transmitters during their transmission.

It is an object of this invention to provide RF radiators and electromagnetic interference (EMI) filters to an ELT that includes a GNSS receiver, to protect from unintentional RF radiators commonly found on numerous aircraft and including the ELT transmitters, and to protect the circuitry of the GNSS receiver in all aspects of flight.

PREFERRED EMBODIMENT OF THE INVENTION

Figure 1:
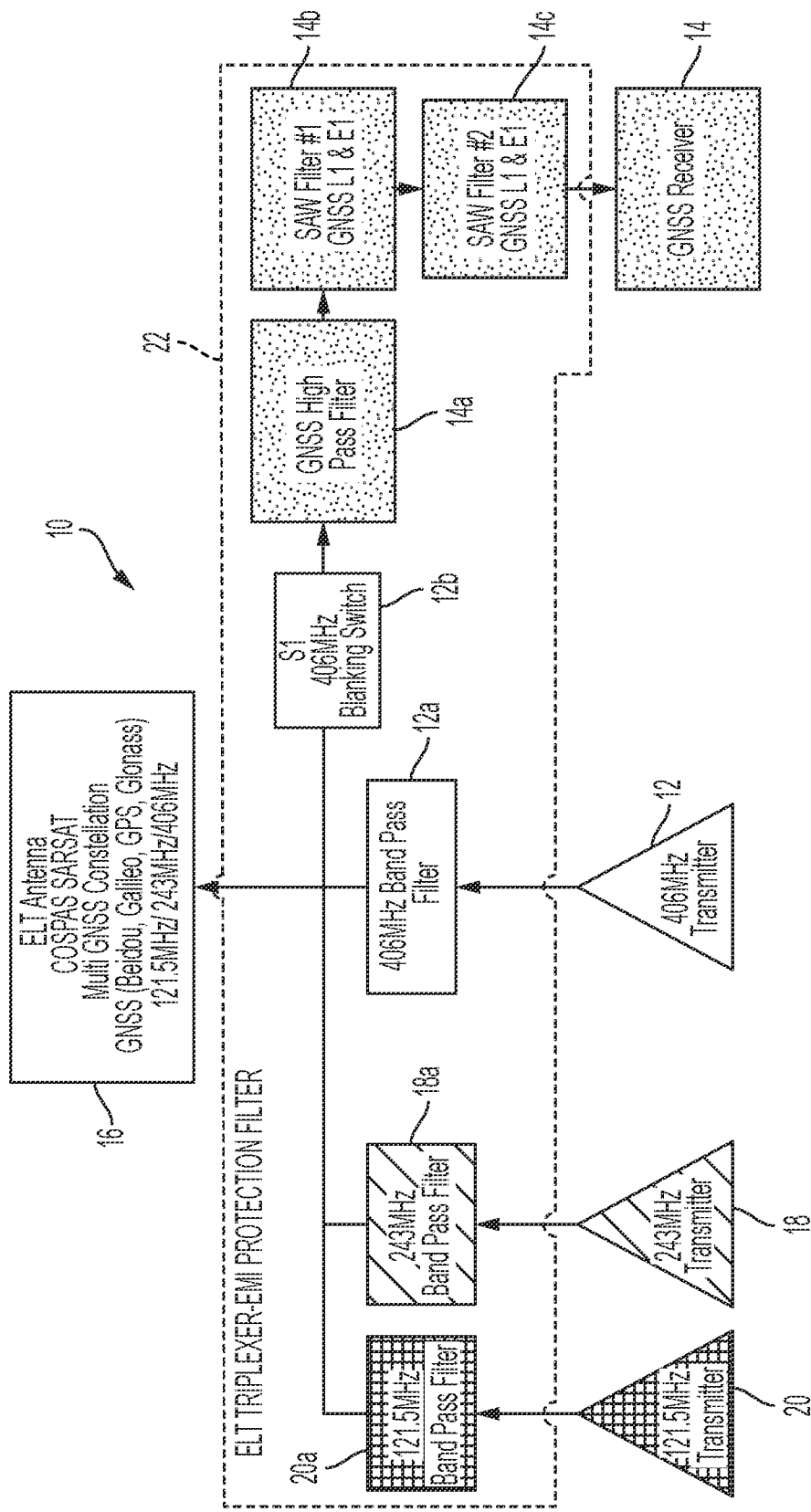
FIG. 1 shows a schematic diagram of the invention of multiple triplexer-EMI protection filters, three ELT transmitters and one GNSS receiver and transmission and receipt circuitry symbolically, including the antenna, to show the invention for protecting the GNSS receiver from unintentional RF radiators and EMI and ELT transmitter signals.

Referring now to FIG. 1 and invention 10, certain components of an ELT are shown that include three emergency transmitters and one GNSS receiver. The primary ELT 406 MHz transmitter 12 transmits 406 MHz emergency signals to the satellites when turned ON. This can be done by a high G force sensor in the ELT (not shown) that senses a crash to cause the 406 MHz transmit 12 to emit emergency and navigational signals to a satellite. The aircraft navigational position signals are based on information from the GNSS receiver 14 mounted in the ELT. The ELT may include two other ELT transmitters 18 and 20, one ELT transmitter 20 having an emergency 121.5 MHz transmitter and a second transmitter 18 that transmits emergency 243 MHz signals, traditional additional emergency signals received from an aircraft. In addition to a high G force sensor that can act as a switch to turn the ELT transmitter(s) 12 ON, the ELT transmitter(s) 12 can also be turned ON by aircraft distress tracker event circuitry that could indicate that the aircraft has an emergency or distress event involving the positional attitude of the airplane or other emergency potential indicating sensors that could turn ON the ELT and cause the ELT transmitter 12 to transmit an emergency event and aircraft location to a satellite. The GNSS receiver provides navigational information periodically, when the ELT is armed (but not ON) to the ELT emergency transmitters 12, 18 and 20.

The ELT transmitters 12, 18, and 20, each has its output connected to a bandpass filter that allow only the specific frequency being transmitted by the ELT transmitter to pass through a bandpass filter on its way to the ELT antenna, which transmits emergency signals to COSPAS SARSAT search and rescue satellites. These filters protect GNSS receiver 14.

The multi GNSS constellation global navigation satellite system may include Beidou, Galileo, GPS, and Glonass satellites that transmit navigational information to the ELT antenna 16 and the GNSS receiver 14 and receive ELT emergency signals The GNSS receiver 14 mounted in the ELT thus can receive satellite navigational information from the antenna 16 as shown. The Si 406 MHz blanking switch 12b is OPEN, whenever the 406 MHz ELT transmitter 12 is operating and sending an emergency signal from the antenna 16. The 406 MHz blanking switch 12b protects the GNSS receiver 14 from damage and receiving degradation during high power 406 MHz signal emergency signal transmissions by providing isolation between the ELT transmitters 12, 18, and 20 signals and the GNSS receiver 14.

The GNSS receiver circuitry from the antenna 16 also includes a GNSS high pass filter 14a from the ELT antenna 16 leading to the GNSS receiver 12 to allow the proper navigational signals from the satellites to reach the GNSS receiver 14. Additions to protecting the GNSS receiver 14 under the invention are a SAW filter No. 1 (14b) connected to another SAW filter No. 2 (14c) which are explained below. SAW filters No. 1 and No. 2, 14b and 14c, include GNSS L1 GPS frequency band and E1 Galileo frequency band signals directly to the GNSS receiver 14.

When the ELT is in the armed position, in an aircraft during flight, in a normal, non-emergency situation, the ELT transmitters 12, 18, and 20 would not be transmitting any information or signals. The only time an the ELT transmitter actually transmits an emergency signal to the satellite is if the ELT high G force sensor switch or a distress tracker abnormal event sensor (not shown) turns the ELT transmitter ON to emit an emergency and aircraft position signal. The norm for every aircraft with an ELT and GNSS receiver 14 is to protect the GNSS receiver 14, using the filters disclosed herein, at all times from unintentional RF radiators, EMI, and the ELT transmitters' signals.

Typically during a normal flight, when the ELT is in the armed position, the GNSS receiver 14 receives navigational information, periodically from multiple satellites (which could be GPS information) so that the GNSS satellite navigation system can periodically provide navigational information to other elements of the ELT circuitry, not shown, that provides an ELT database to store the aircraft's current position, periodically, during the flight. Thus the emergency transmission of an ELT signal would contain aircraft position navigational information provided by the GNSS receiver 14.

Of concern, during normal flight operations, without an emergency, an aircraft has other RF transmitters and receivers (each aircraft varies) that create EMI or unintentional RF radiators that could damage or degrade the performance of the GNSS receiver 14 and its navigational functions. For example, many aircraft have high power iridium transmitters and receivers and high-power KU and KA band SATCOM transmitters (14 GHz to 30 GHz). Different tri-band antennas have different aperture and power densities that can result in high EMI fields so that the SAW filter No. 1 (14b) and SAW filter NO. 2 (14c) protect the GNSS receiver 14. The filters provided such as the GNSS high pass filter 14a and the SAW filters No. 1 and No. 2 (14b and 14c) enable the ELT to protect the GNSS receiver 14 from sensitivity degradation from harmonics from 121.5 MHz and 243 MHz transmitters 20 and 18. The combination of the GNSS high pass filter 14a and the SAW No. 1 and No. 2 filters 14b and 14c enable the ELT to protect the GNSS receiver 14 from VHF broadcast transmitters, L band transmitters, and Inmarset transmitters, commonly found in aircraft.

The combination of the SAW no. 1 and SAW no. 2 filters 14b and 14c enable the ELT to protect the GNSS receiver 14 from any interference from the Thuraya satellite system, the Globalstar satellite system, and the One Web satellite system.

The unintentional RF radiators filter protection for a COSPAS SARSAT emergency locator transmitter (ELT) GNSS receiver system is shown and described herein in what is considered to be the most practical and preferred embodiment. It is recognized, however, that departures may be made therefrom within the scope of the invention obvious modifications will occur to a person skilled in the art.

What is claimed is:

1. An COSPAS SARSAT emergency locator transmitter (ELT) that includes a 406 MHz transmitter and Global Navigation Satellite System (GNSS) receiver, for use in an aircraft, the improvement comprising:
   an ELT transmitting and receiving antenna connected to said 406 MHz signal transmitter output; and
   said ELT transmitting and receiving antenna connected to a 406 MHz blanking switch, the 406 MHz blanking switch connected to a GNSS high-pass filter connected to said GNSS receiver, protecting the GNSS receiver from unintentional radio frequency (RF) radiators, electromagnetic interference (EMI), and 406 MHz signals;
   a first surface acoustic wave (SAW) filter connected between said GNSS high-pass filter and said GNSS receiver to protect the GNSS receiver from unintentional RF radiators; and
   a second surface acoustic wave (SAW) filter connected between said first SAW filter and said GNSS receiver, to further protect the GNSS receiver from unintentional RF radiators, EMI, and 406 MHz signal RF harmonics.

2. The improved device as in claim 1, including:
   the combination of the GNSS high pass filter and said first and second SAW filters protecting the GNSS receiver from a high power high frequency (HF) transmitter found in an aircraft, from a very high frequency (VHF) broadband transmitter found in an aircraft, from Inmarsat transmitters, from any L band satellite transmitters, from Thuraya satellite interference, from Globalstar satellite interference, and from One Web satellite interference.

* * * * *